United States Patent [19]

Lawyer et al.

[11] 4,007,388
[45] Feb. 8, 1977

[54] DYNAMOELECTRIC MACHINE LOAD PACKAGE HAVING AN ACOUSTICALLY ISOLATED ENCLOSURE

[75] Inventors: John F. Lawyer, Albany, N.Y.; Vincent G. Terry, Beverly, Mass.

[73] Assignee: General Electric Company, Schenectady, N.Y.

[22] Filed: June 19, 1975

[21] Appl. No.: 588,514

[52] U.S. Cl. .............................. 310/51; 181/33 A
[51] Int. Cl.² ........................................ H02K 5/24
[58] Field of Search ................. 310/51, 50, 89, 91, 310/66, 83, 111–113; 248/28, 15, 18, 22, 26; 174/42; 62/296; 312/208, 214; 336/100; 181/33 A, 33 K, 61, 62; 73/100

[56] References Cited

UNITED STATES PATENTS

| | | | |
|---|---|---|---|
| 2,534,808 | 12/1950 | Bevington | 248/20 |
| 2,888,232 | 5/1959 | Kroeger | 181/33 A |
| 3,114,060 | 12/1963 | Goettl | 310/51 |
| 3,125,735 | 3/1964 | Twomey | 336/100 |
| 3,125,736 | 3/1964 | Aronson | 336/100 |
| 3,175,174 | 3/1965 | Simmons | 336/100 |
| 3,390,929 | 7/1968 | Gassino | 248/20 |

FOREIGN PATENTS OR APPLICATIONS

| | | | |
|---|---|---|---|
| 135,150 | 8/1947 | Australia | 310/51 |
| 1,083,838 | 1/1955 | France | 181/33 A |
| 1,406,003 | 7/1965 | France | 310/51 |
| 1,137,120 | 9/1962 | Germany | 310/51 |

*Primary Examiner*—R. Skudy
*Attorney, Agent, or Firm*—James W. Mitchell; John F. Ahern

[57] ABSTRACT

A dynamoelectric machine load package has an acoustically isolated enclosure for reducing the amount of structure-borne and air-borne vibration and noise reaching the surrounding environment. Bearing pedestals for supporting a rotating shaft of a rotating field winding of a dynamoelectric machine and a reduction gear for driving the rotating shaft are firmly mounted on a load package base which is firmly attached to a foundation. The enclosure and a stationary armature of the dynamoelectric machine are independently resiliently mounted on the load package base. The enclosure is free to vibrate independently of the load package so that vibrations are not directly transmitted from the load package to the enclosure and are not directly transmitted from the enclosure to the load package base. Acoustic damping material is applied to interior walls of the enclosure.

6 Claims, 4 Drawing Figures

DYNAMOELECTRIC MACHINE LOAD PACKAGE HAVING AN ACOUSTICALLY ISOLATED ENCLOSURE

BACKGROUND OF THE INVENTION

1. Field of the Invention

The present invention relates to a packaged dynamoelectric machine having an enclosure. More particularly, the invention relates to a dynamoelectric machine load package having an acoustically isolated enclosure for reducing the amount of structure-borne and air-borne noise reaching the surrounding environment.

2. Description of the Prior Art

A gas turbine driven dynamoelectric machine load package includes a load package base upon which is mounted a dynamoelectric machine such as a generator, a reduction gear and associated equipment for generator and gear ventilation. Such a load package is designed to be assembled in a factory and then shipped as a unit to a site, possibly outdoors, where it will be used.

The load package base comprises a horizontal steel base plate supported on I-beams placed around the periphery thereof. Additional I-beams for supporting the base plate may be placed at various other locations under the base plate. The dynamoelectric machine includes a stator, preferably the armature winding, which includes an armature frame. The dynamoelectric machine further includes a rotor, preferably the field winding, which includes a rotatable generator shaft supported by bearing pedestals. The rotatable generator shaft is mechanically connected to be driven by the reduction gear. The reduction gear, the bearing pedestals and the armature frame are each firmly attached to the base plate. In order to preserve shaft and bearing alignment, it is essential that the reduction gear and the bearing pedestals be firmly attached to the steel base plate in steel-to-steel contact. The base plate may include a cut-out so that a portion of the armature can extend below the base plate to reduce the overall height of the load package.

The load package is adapted to mate at one end with a first similar package including a gas turbine having an output shaft mechanically connected to rotate the reduction gear and thus the generator shaft. The load package may be adapted to mate at the other end with a second similar package including electrical switching and control equipment. A solidly-attached enclosure for reducing the amount of noise transmitted from the load package to the surrounding environment may be placed around the load package. The enclosure, if included, is assembled to the load package at the factory and shipped with the load package. Such an enclosure is open at one end and is adapted to mate at the one end with a first similar enclosure for the first similar package including the gas turbine. Electrical bus bars may project from an opening in the other end of the enclosure for electrical connection to the electrical switching and control equipment included in the second similar package. A second similar enclosure for the second similar package is adapted to mate with the other end of the load package enclosure.

A load package containing a reduction gear and a generator produces both vibration and audible noise during operation. The vibration and noise produced is accentuated by the firm mounting of the reduction gear and of the generator shaft bearing pedestals to the steel base plate. Due to this firm mounting, vibrations are directly transmitted to the base plate which acts as a large vibrating diaphragm to transmit the vibrations as sound through the surrounding air. As discussed above, this firm mounting is required in order to preserve shaft and bearing alignment. In particular, two "noise spikes" at discrete frequencies, namely 120 Hertz and approximately 1,000 Hertz, are produced and have been found to be especially difficult to eliminate. The 120 Hertz noise spike originates within the generator and the approximately 1,000 Hertz noise spike originates within the reduction gear.

Prior art attempts using solidly-attached enclosures to reduce the structure-borne and air-borne noise produced by a reduction gear and a generator in a load package have included the following. Individual components of the enclosure and load package have all been designed to have all mechanical resonant frequencies well above or well below forcing frequencies generated by the reduction gear and the generator. In order to isolate and attenuate vibration and sound at a frequency of 120 Hertz, the armature has been acoustically isolated from the load package base either by neoprene rubber isolation pads between the armature frame and the load package base or by using a "spring bar mounting" to isolate the armature from its frame and firmly attaching the armature frame to the load package base. A spring bar mounting is a mounting in which the armature is hung on a plurality of relatively long steel bars, the upper ends of the steel bars being attached to spring bars located near the top of and attached to the armature frame. Gear shaft torsional dampers have been used in an attempt to attenuate gear noise originating within the reduction gear. Lead-core damping pads have been cemented to various panels of the enclosure structure which were found to vibrate with a high energy. Other sound deadening and absorbing material, such as glass fiber and acoustic cloth lining, has been applied to various panels of the enclosure structure. Inlet and outlet ventilation baffles and silencers have been used on all ventilation air flow paths.

The above-described prior art attempts using solidly-attached enclosures to reduce noise produced by a generator load package have not been entirely successful. In particular, the sound caused by vibration of the diaphragm-like steel base plate and the 120 Hertz and approximately 1,000 Hertz noise spikes have not been satisfactorily eliminated.

SUMMARY OF THE INVENTION

Accordingly, it is an object of the invention to provide a dynamoelectric machine load package having an acoustically isolated enclosure, the enclosure being adapted to reduce structure-borne and air-borne noise generated by the dynamoelectric machine load package and transmitted to the surrounding environment to an acceptable level, and particularly to attenuate noise spikes generated at 120 Hertz and approximately 1,000 Hertz.

It is another object of the invention to provide a dynamoelectric machine load package having an enclosure with supports which are sufficiently strong and durable to support 15,000 pounds of enclosure structure up to 9 g impact during shipment, to support 50 pounds per square foot of roof load, to withstand hurricane force winds and to operate in a temperature range of −30° F. to 120° F.

It is a further object of the invention to provide a dynamoelectric machine load package having an enclosure which provides almost complete elimination of primary forcing excitation generated by the dynamoelectric machine load package reaching the surrounding environment.

These and other objects are accomplished by the invention which provides a dynamoelectric machine load package enclosure supported by resilient isolation mounts so as to be free to vibrate independently of the load package. The armature and the enclosure are independently resiliently mounted on the load package base. Additionally, resilient seals are provided at all interfaces between relatively moving parts so as to permit relative movement while preventing the flow of air and the transmission of air-borne noise through the interfaces.

BRIEF DESCRIPTION OF THE DRAWINGS

While the novel features of the invention are set forth with particularlity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

Figure 1:
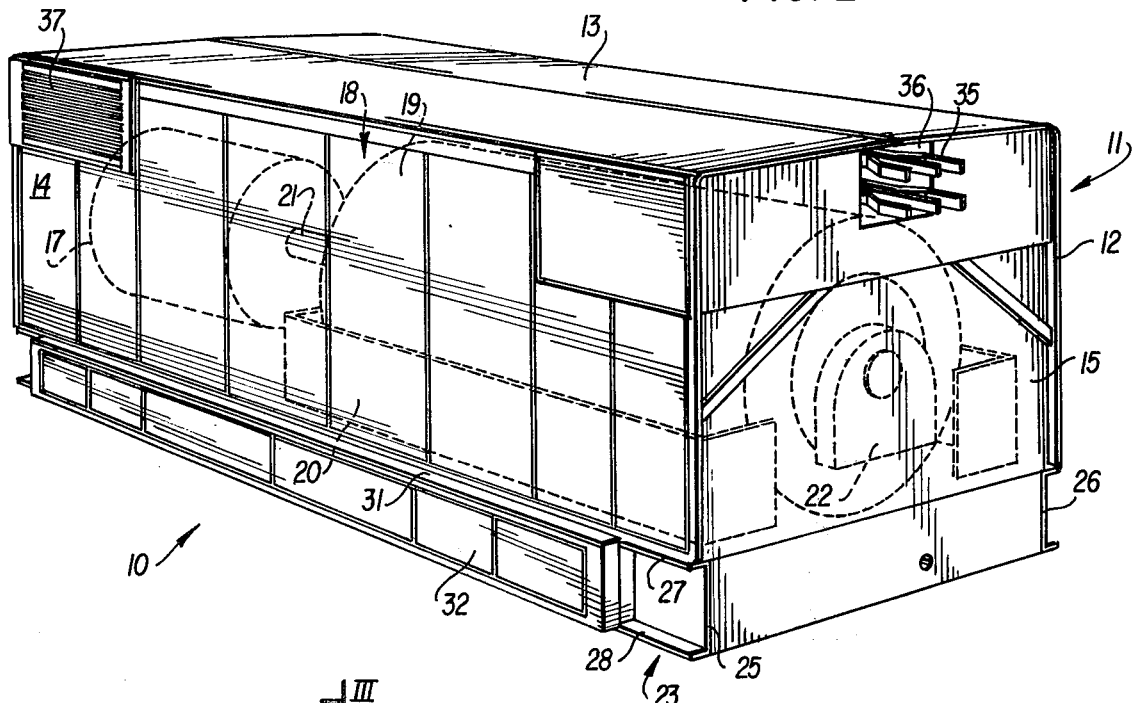
FIG. 1 shows a perspective overview of a load package including an acoustically isolated enclosure according to the invention.

Referring first to FIG. 1, there is shown the outside of a dynamoelectric machine load package generally designated 10 and a separate enclosure 11 therefor. The enclosure 11 includes an upper main part 12 having a top 13, two sides, one of which is designated at 14, and a closed end 15. The other end (not visible) opposite the closed end 15 is open and is adapted to mate in spaced relationship with a first similar enclosure (not shown) for a gas turbine package. The entire load package 10 is adapted to be mounted at discrete points upon foundation pads, one of which is shown at 16 (in FIGS. 2 and 3). A reduction gear 17 and a dynamoelectric machine such as a generator 18 which includes a stator such as stationary armature 19 and a stator frame such as armature frame 20, all shown in broken lines, are mounted within the enclosure 11. The reduction gear 17 is mechanically connected by a rotatable generator shaft 21 to drive a rotor such as the rotating field (not shown) of the generator 18. The rotatable generator shaft 21 is supported by bearing pedestals such as pedestal 22.

The load package 10 includes a load package base 23 comprising a horizontal base plate 24 (shown in FIGS. 2 and 3) supported by I-beams, such as I-beams 25 and 26, placed around the periphery thereof. The I-beams 25 and 26 each include an upper I-beam rail 27 and a lower I-beam rail 28, the lower I-beam rail 28 adapted to be firmly attached to the foundation pad 16 by bolts, one of which is shown at 29 (in FIG. 3). Steel bottom plates, one of which is shown at 30 (in FIG. 3), are attached to the lower I-beam rail 28 and form an enclosure bottom for the load package 10. There may be additional I-beams (not shown) for supporting the base plate 24 placed at various other locations under the base plate 24. The base plate 24 may include a cut-out (not shown) so that a portion of the armature frame 20 can extend below the base plate 24.

The upper enclosure part 12 includes, along each side, a horizontal upper enclosure side rail 31 extending along the lower edge thereof. A base skirt 32 is firmly attached by bolts, such as bolt 33 (shown in FIGS. 2 and 3), to the upper enclosure side rail 31 and extends downwardly therefrom. Internal upper mounts, one of which is shown at 34 (in FIGS. 2 and 3), support the upper enclosure side rail 31 on the upper I-beam rail 27. Bus bars 35 for electrical connection to switching and control equipment in a second similar enclosure (not shown) which is adapted to mate in spaced relationship with the closed end 15 project through an opening 36 therefor in the closed end 15. A ventilating louver 37 containing internal baffles (not shown) provides a passageway for ventilating air between the interior of the enclosure 11 and the surrounding environment and cooperates with equipment (not shown) for generator and gear ventilation contained within the enclosure 11. Internal cavities, passageways and baffles (not shown) may be associated with the ventilation equipment.

The first and second similar enclosures (not shown) which are referred to above are each separated from the enclosure 11 by a gap of several inches and interfaced through a flexible rubber seal (not shown) in order to permit the relative movement of the various enclosures while at the same time preventing the passage of air and air-borne noise through the gaps. Any other necessary connections to interfacing equipment are made through resilient connectors. Thus, the enclosure 11 is adapted for completely resilient connection with all interfacing equipment.

Figure 2:
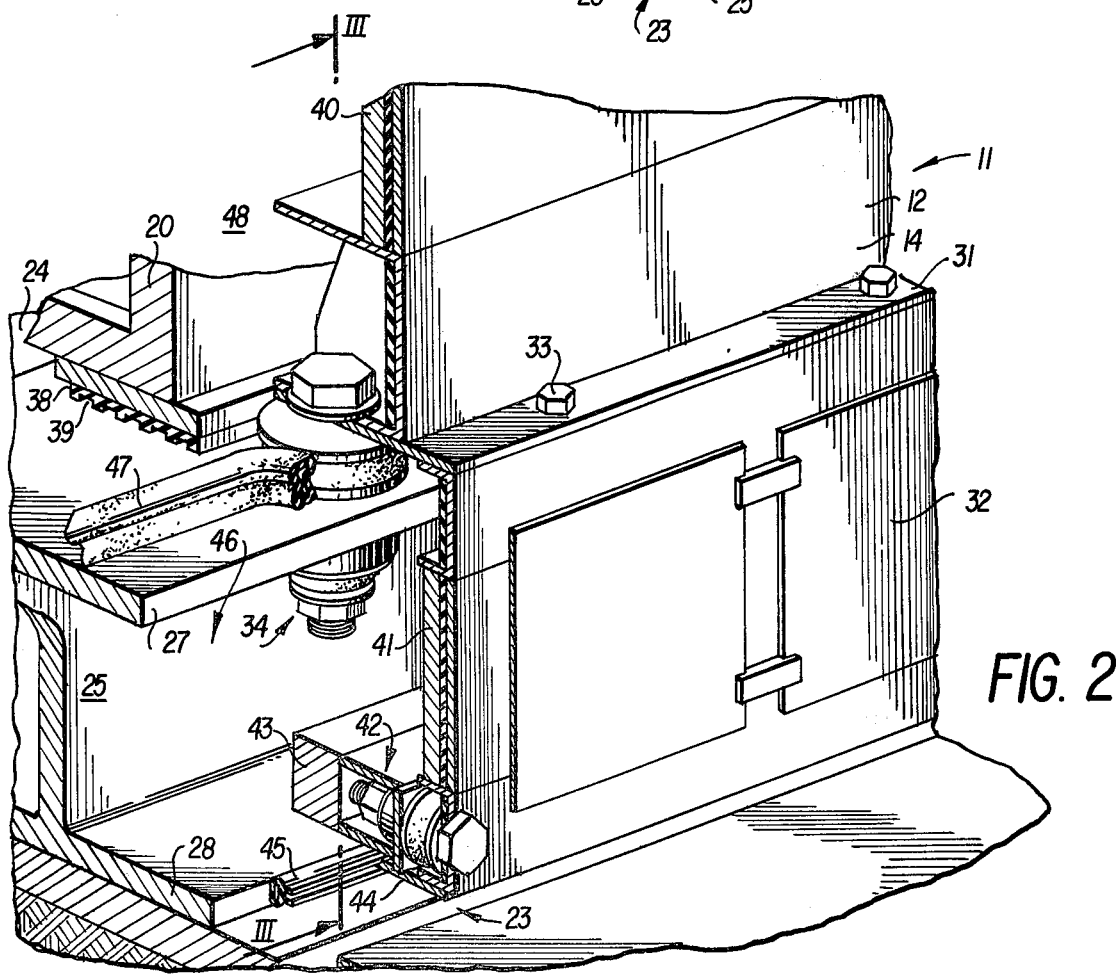
FIG. 2 shows a perspective cut-away view of a section along the lower part of one of the longer sides of the load package and enclosure shown in FIG. 1.
Figure 3:
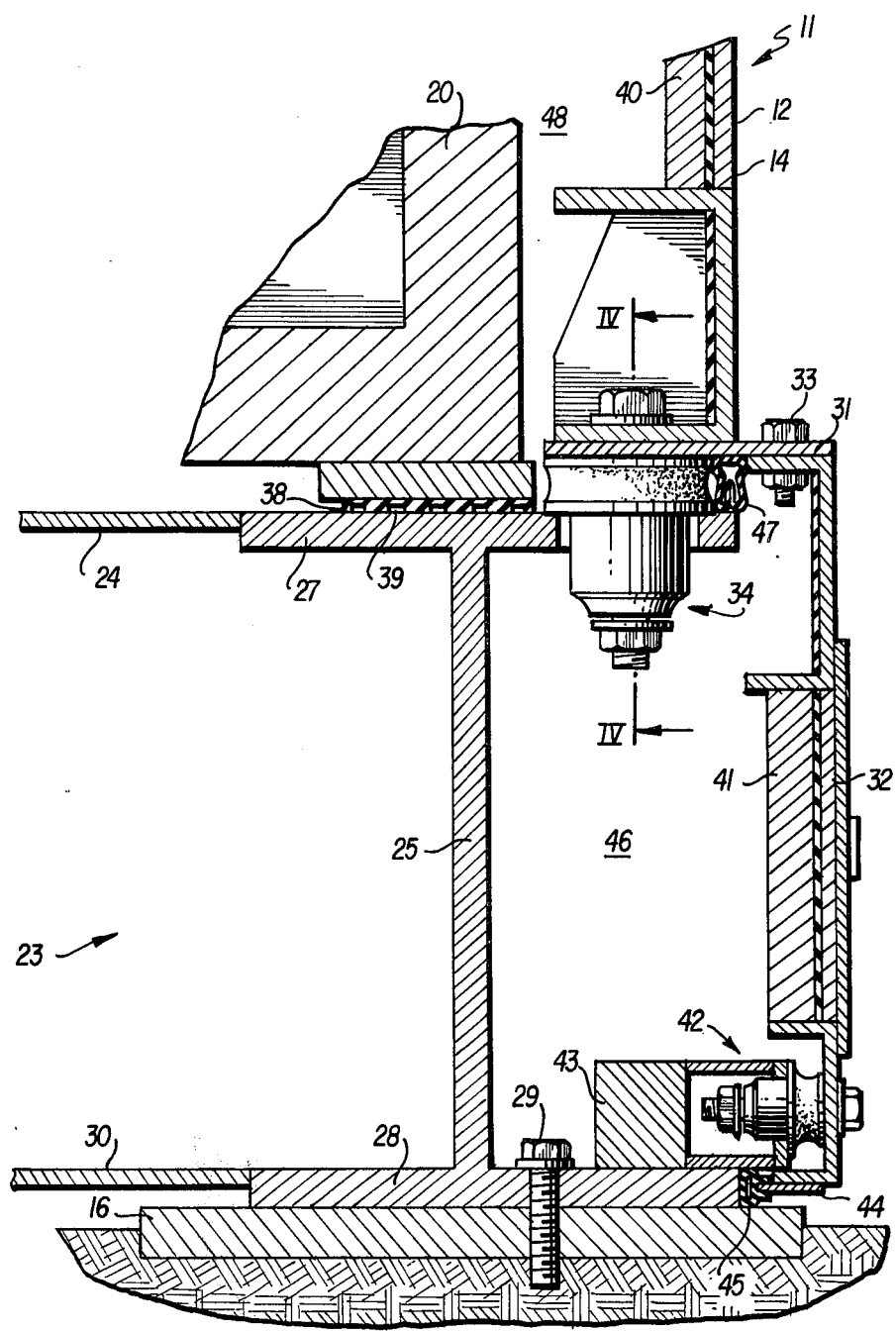
FIG. 3 shows a sectional view along the line III—III of FIG. 2.

Referring now to FIGS. 2 and 3, means for supporting and acoustically isolating the generator armature 19 (shown in FIG. 1) from the load package base 23 are provided. Preferably, the armature 19 is firmly attached to the armature frame 20 and the frame 20 is supported on the upper I-beam rail 27 by a plurality of resilient neoprene rubber isolation pads, one of which is shown at 38. The isolation pad 38 is of generally flat configuration and has channels 39 cut into one face. A suitable size for the pad 38 has been found to be five-sixteenths inch thick and of a sufficient area so that each square inch thereof supports approximately 250 pounds. Alternatively, the armature 19 may be supported and acoustically isolated from the load package base 23 by isolating the armature 19 from the armature frame 20 with a known spring bar mounting, in which case the isolation pads 38 would not be included. A spring bar mounting is a mounting in which the armature is hung on a plurality of relatively long steel bars, the upper ends of the steel bars being attached to spring bars located near the top of and attached to the armature frame. The means for supporting and acoustically isolating the armature 19 from the load package base 23 may be eliminated while still retaining some of the benefits of the invention, but a higher noise level will result.

Preferably, sound deadening material 40 and 41 is applied to the interior walls of the upper enclosure part 12 and the base skirt 32, respectively. The sound deadening material 40 and 41 may, for example, be glass fiber blanket or acoustic cloth lining.

The enclosure side rail 31 is supported on the upper I-beam rail 27 by isolation mounts such as the upper mount 34. Preferably, a total of eight upper mounts 34 are provided (four along each enclosure side rail 31) of a sufficiently large size to support the entire structure. These isolation mounts may be of the type manufactured by the Barry-Wright Corporation and called "Barry Mounts." Barry Mount vibration isolator Model No. 516-3 has been found to be suitable for the upper mounts 34. Additionally, there are provided lower isolation mounts, one of which is shown at 42, between the lower edge of the base skirt 32 and a mounting projection 43 firmly attached to the lower I-beam rail 28. Preferably, a total of six lower mounts 42 are provided (three along each side). Barry Mount vibration isolator Model No. 507-5 has been found to be suitable for the lower mounts 42. Further details of the isolation mounts 34 and 42 are discussed below with reference to FIG. 4.

Still referring to FIGS. 2 and 3, a lower extension 44 of the base skirt 32 extends from the lower edge of the base skirt 32 toward the lower I-beam rail 28. A resilient seal 45, which may be a rubber loop seal, is provided between the extension 44 and the lower I-beam rail 28 so as to permit relative movement of the extension 44 and the lower I-beam rail 28 and at the same time to prevent the flow of air and of air-borne noise through the interface between the extension 44 and the lower base rail 28. It will be apparent that a base skirt cavity 46 is defined, the cavity 46 generally defined by the I-beam 25 and the base skirt 32. In order to prevent air flow and the transmission of air-borne noise through the interface between the enclosure side rail 31 and the I-beam rail 27, a similar resilient seal 47, which also may be a rubber loop seal, is provided between the enclosure side rail 31 and the upper I-beam rail 27. An upper main cavity 48 is thereby generally defined by the upper enclosure part 12 and the base plate 24, the cavity 48 generally including the entire interior of the upper enclosure part 12.

Figure 4:
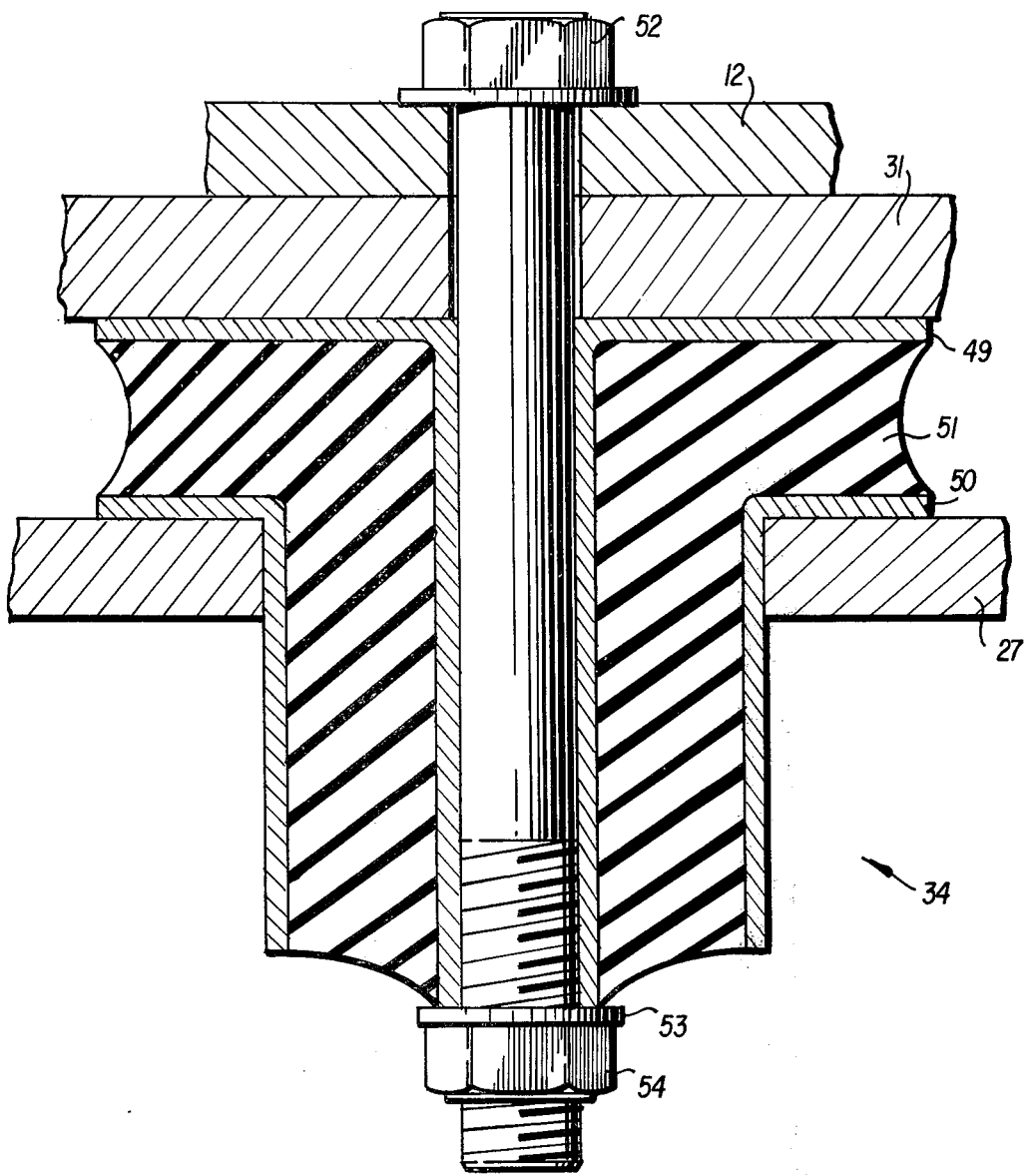
FIG. 4 shows a sectional view along the line IV—IV of FIG. 3.

Referring now to FIG. 4, there is shown, in section, the upper mount 34. While the upper mount 34 was chosen for illustrative purposes, it will be understood that FIG. 4 is also applicable to the lower mount 42, mounts 34 and 42 differing only in size. As was discussed above with reference to FIGS. 2 and 3, mounts 34 and 42 may be Barry Mounts manufactured by Barry-Wright Corporation.

The mount 34 generally resiliently supports the enclosure side rail 31 on the upper I-beam rail 27. The mount 34 comprises inner and outer mounting members 49 and 50 separated by an elastomer member 51. The elastomer is preferably a neoprene rubber. Each of the mounting members 49 and 50 is generally tubular with an annular flange extending radially outwardly at one end thereof. A hole in the upper I-beam rail 27 receives the outer mounting member 50, and thus the entire mount 34. The outer mounting member 50 is firmly attached to the upper I-beam rail by a pair of bolts (not shown). The enclosure side rail 31 is firmly attached by a bolt 52, washer 53 and nut 54, to the inner mounting member 45.

The operation of the preferred embodiment will now be described. The isolation pads 38 resiliently support the armature frame 20 upon the base plate 24 and provide attenuation of transmitted noise and vibration, particularly at a frequency of 120 Hertz. The isolation mounts 34 and 42 resiliently support the enclosure 11 upon the load package base 23. Thus, the armature 19 and the enclosure 11 are independently resiliently supported upon the load package base 23. The sound deadening material 40 and 41 applied to the interior side of the walls of the enclosure 11 serves to absorb noise and to damp any vibration of the various panels of the enclosure 11.

The resilient seals 45 and 47 permit free relative movement of the enclosure 11 and the load package base 23 while preventing air flow through the various interfaces. The various interval cavities associated with the ventilating equipment in the enclosure 11 include the base skirt cavity 46 and the upper main cavity 48. The baffle-containing passageways connecting the various cavities permit the relatively free passage of ventilating air and at the same time block transmission of sound. Resilient seal 47 blocks the flow of air and the transmission of air-borne noise between the upper main cavity 48 and the base skirt cavity 46, which flow and transmission would otherwise occur through the gap between the enclosure side rail 31 and the upper I-beam rail 27. Similarly, resilient seal 45 blocks the direct flow of air and the transmission of air-borne noise between the base skirt cavity 46 and the surrounding environment, which flow and transmission would otherwise occur through the gap between the base skirt extension to and the lower I-beam rail 28. Air flow is thus forced to occur through the baffle-containing passageways.

It will be apparent, therefore, that due to the independent resilient mounting on the load package base 23, of the armature 19 and of the enclosure 11, the enclosure 11 will be free to vibrate independently of the rest of the load package 10. Vibration will not be directly transmitted from the load package 10 to the enclosure and vibration will not be directly transmitted from the enclosure 11 to the load package base 23. Substantial elimination of the noise spikes at 120 Hertz and at approximately 1,000 Hertz is achieved together with a 99.3 percent reduction in primary forcing excitation. Additionally, the isolation mounts 34 and 42 satisfy the mechanical strength requirements.

While a specific embodiment of the invention has been illustrated and described herein, it is realized that modifications and changes will occur to those skilled in the art. It is therefore to be understood that the appended claims are intended to cover all such modifications and changes as fall within the true spirit and scope of the invention.

What is claimed as the invention is:

1. A dynamoelectric machine load package including an acoustically isolated enclosure, said load package comprising:
    a. a load package base, said load package base further comprising:
        i. a base plate, and
        ii. I-beams for supporting said base plate, said I-beams positioned around the periphery of said base plate and having upper and lower I-beam rails,
    b. a dynamoelectric machine including a stator and a frame for said stator;

c. a plurality of resilient isolation pads for resiliently supporting said stator frame on said upper I-beam rails;
d. a reduction gear for driving said rotor, said reduction gear firmly mounted in vibration-transmitting relationship to said base plate;
e. bearing pedestals for supporting a rotor shaft of said dynamoelectric machine, said pedestals firmly mounted in vibration-transmitting relationship to said base plate;
f. an enclosure, said enclosure further comprising:
   i. an enclosure side rail along each side of said enclosure,
   ii. an upper main part having a top, two sides and an end, said upper main part firmly attached to said enclosure side rail, and
   iii. lower base skirt panels firmly attached to and extending downwardly from said enclosure side rails so as to form a lower extension of sides of said upper main part;
g. a first plurality of isolation mounts each arranged between one of said enclosure side rails and a corresponding one of said upper I-beam rails to support said enclosure side rail on said load package base;
h. a second plurality of isolation mounts each arranged between a lower edge of one of said base skirt panels and a corresponding one of said lower I-beam rails;
i. resilient seals between each enclosure side rail and a corresponding one of said upper I-beam rails to permit relative movement of the enclosure and said load package base while preventing air flow and transmission of air-borne noise between an upper main generator cavity and a lower base skirt cavity; and,
j. resilient seals between the lower edges of said base skirt panels and the corresponding lower I-beam rails to permit relative movement of said enclosure and said base while preventing air flow and transmission of air-borne noise between said lower base skirt cavity and the surrounding environment; whereby air-borne noise and vibration transmitted to the surrounding environment is reduced.

2. The load package of claim 1, further comprising acoustic damping material applied to interior walls of said enclosure.

3. The load package of claim 1, wherein said resilient seals between said enclosure side rails and said corresponding upper base rails and said resilient seals between the lower edges of said base skirt panels and said corresponding lower I-beam rails are rubber loop seals.

4. The load package of claim 1, wherein said dynamoelectric machine is a generator, said stator is an armature winding and said rotor is a field winding.

5. In combination with a dynamoelectric machine of the type including a rotor mounted field winding disposed within a stationary stator wherein the dynamoelectric machine is supported on a horizontal base, said horizontal base comprising a horizontal surface and vertical support members; means are provided for reducing the noise level from the dynamoelectric machine to the surrounding environment, said means comprising:
an enclosure comprising a top portion and a plurality of acoustically treated vertical walls for substantially enclosing said dynamoelectric machine;
a plurality of isolation mounts for connecting said vertical walls to said horizontal base, said isolation mounts for preventing the transmission of vibrations from said horizontal base to said vertical walls;
resilient sealing means between said vertical walls and said horizontal base, said resilient sealing means for preventing the transmission of air-borne noise between the interior of the enclosure and the surrounding environment.

6. The noise reducing means recited in claim 5 further comprising:
a plurality of resilient pads disposed between the stator and the vertical support members whereby transmission of vibrations from the stator to the horizontal surface is avoided.

* * * * *